United States Patent
Chen et al.

(10) Patent No.: US 7,657,520 B2
(45) Date of Patent: Feb. 2, 2010

(54) PROVIDING HISTORY AND TRANSACTION VOLUME INFORMATION OF A CONTENT SOURCE TO USERS

(75) Inventors: Johnny Chen, Mountain View, CA (US); Mohit Aron, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 601 days.

(21) Appl. No.: 11/070,268

(22) Filed: Mar. 3, 2005

(65) Prior Publication Data

US 2006/0200445 A1 Sep. 7, 2006

(51) Int. Cl.
G06F 7/00 (2006.01)
G06F 17/30 (2006.01)
(52) U.S. Cl. ............................................. 707/5; 725/28
(58) Field of Classification Search ................ 707/1–10, 707/100–104.1, 200–206; 715/200; 725/28, 725/29, 42, 53, 101; 705/1, 10
See application file for complete search history.

(56) References Cited

U.S. PATENT DOCUMENTS

| | | | |
|---|---|---|---|
| 5,636,346 A | 6/1997 | Saxe | |
| 5,724,521 A | 3/1998 | Dedrick et al. | |
| 5,845,265 A | 12/1998 | Woolston | |
| 5,918,010 A | 6/1999 | Appleman et al. | |
| 5,920,854 A | 7/1999 | Kirsch et al. | |
| 5,931,901 A | 8/1999 | Wolfe et al. | |
| 5,974,398 A | 10/1999 | Hanson et al. | |
| 6,026,368 A | 2/2000 | Brown et al. | |
| 6,044,375 A | 3/2000 | Shmueli et al. | |
| 6,061,659 A | 5/2000 | Murray | |
| 6,067,570 A | 5/2000 | Kreynin et al. | |
| 6,078,866 A | 6/2000 | Buck et al. | |
| 6,223,163 B1 | 4/2001 | Van Luchene | |
| 6,230,170 B1 | 5/2001 | Zellweger et al. | |
| 6,247,009 B1 | 6/2001 | Shiiyama et al. | |
| 6,253,189 B1 | 6/2001 | Feezell et al. | |

(Continued)

FOREIGN PATENT DOCUMENTS

EP 1026610 A2 8/2000

(Continued)

OTHER PUBLICATIONS

Dimitrova et al., Connected by media [vision and views], Oct.-Dec. 2001, vol. 8, IEEE, 13-15.*

(Continued)

*Primary Examiner*—Jean B Fleurantin
(74) *Attorney, Agent, or Firm*—Fenwick & West LLP

(57) ABSTRACT

A computer-implemented system and method for providing a legitimacy rating of a content source are provided. A request for a document is received. An electronic document associated with a content source is passed by a document provider in response to the request. A legitimacy rating of the content source is passed. Examples of legitimacy rating information include, for example, a history rating of the content source based on the length of time the document provider has published documents associated with the content source and a transaction volume rating of the content source based on the number of electronic documents associated with the content source that are passed by the document provider.

22 Claims, 7 Drawing Sheets

U.S. PATENT DOCUMENTS

| | | | |
|---|---|---|---|
| 6,269,361 B1 | 7/2001 | Davis et al. | |
| 6,285,987 B1 | 9/2001 | Roth et al. | |
| 6,298,348 B1 | 10/2001 | Eldering | |
| 6,324,519 B1 | 11/2001 | Eldering | |
| 6,336,132 B2 | 1/2002 | Appleman et al. | |
| 6,421,675 B1 | 7/2002 | Ryan et al. | |
| 6,526,440 B1* | 2/2003 | Bharat | 709/219 |
| 7,136,871 B2* | 11/2006 | Ozer et al. | 707/104.1 |
| 7,281,008 B1* | 10/2007 | Lawrence et al. | 707/7 |
| 2001/0042064 A1 | 11/2001 | Davis et al. | |
| 2001/0047297 A1 | 11/2001 | Wen | |
| 2001/0051911 A1 | 12/2001 | Marks et al. | |
| 2002/0002509 A1 | 1/2002 | Wagorn et al. | |
| 2002/0002525 A1 | 1/2002 | Arai et al. | |
| 2002/0026359 A1 | 2/2002 | Long et al. | |
| 2002/0035536 A1 | 3/2002 | Gellman | |
| 2002/0038282 A1 | 3/2002 | Montgomery | |
| 2002/0040311 A1* | 4/2002 | Douglass et al. | 705/7 |
| 2002/0046099 A1 | 4/2002 | Frengut et al. | |
| 2002/0046104 A1 | 4/2002 | Kaddeche et al. | |
| 2002/0077891 A1 | 6/2002 | Castle et al. | |
| 2002/0099605 A1 | 7/2002 | Weitzman et al. | |
| 2002/0111898 A1 | 8/2002 | Numaoka et al. | |
| 2002/0123988 A1 | 9/2002 | Dean et al. | |
| 2002/0165773 A1 | 11/2002 | Natsuno et al. | |
| 2002/0184097 A1 | 12/2002 | Hijiri et al. | |
| 2002/0194062 A1 | 12/2002 | Linide | |
| 2002/0198780 A1 | 12/2002 | Kawakami et al. | |
| 2003/0037334 A1 | 2/2003 | Khoo et al. | |
| 2003/0070167 A1 | 4/2003 | Holtz et al. | |
| 2003/0083937 A1 | 5/2003 | Hasegawa et al. | |
| 2003/0149618 A1 | 8/2003 | Sender et al. | |
| 2003/0163372 A1 | 8/2003 | Kolsy | |
| 2003/0216963 A1 | 11/2003 | Ishiwaka et al. | |
| 2004/0015397 A1 | 1/2004 | Barry et al. | |
| 2004/0019523 A1 | 1/2004 | Barry et al. | |
| 2004/0044571 A1 | 3/2004 | Bronnimann et al. | |
| 2004/0054577 A1 | 3/2004 | Inoue et al. | |
| 2004/0054589 A1 | 3/2004 | Nicholas et al. | |
| 2004/0059708 A1 | 3/2004 | Dean et al. | |
| 2004/0059712 A1 | 3/2004 | Dean et al. | |
| 2004/0093327 A1 | 5/2004 | Anderson et al. | |
| 2004/0093620 A1 | 5/2004 | Iino et al. | |
| 2004/0119740 A1 | 6/2004 | Chang et al. | |
| 2004/0143499 A1 | 7/2004 | Dietsch et al. | |
| 2004/0143843 A1 | 7/2004 | Khoo et al. | |
| 2004/0167928 A1 | 8/2004 | Anderson et al. | |
| 2004/0193696 A1* | 9/2004 | Howard et al. | 709/217 |
| 2004/0249709 A1 | 12/2004 | Donovan et al. | |
| 2005/0065806 A1 | 3/2005 | Harik | |
| 2005/0071224 A1 | 3/2005 | Fikes et al. | |
| 2005/0071741 A1* | 3/2005 | Acharya et al. | 715/500 |
| 2005/0096979 A1 | 5/2005 | Koningstein | |
| 2005/0131758 A1 | 6/2005 | Desikan et al. | |
| 2005/0131762 A1 | 6/2005 | Bharat et al. | |
| 2005/0144069 A1 | 6/2005 | Wiseman et al. | |
| 2005/0216335 A1 | 9/2005 | Fikes et al. | |
| 2005/0222900 A1 | 10/2005 | Fuloria et al. | |
| 2005/0222903 A1 | 10/2005 | Buchheit et al. | |
| 2005/0222989 A1 | 10/2005 | Haveliwala et al. | |
| 2005/0223002 A1 | 10/2005 | Agarwal et al. | |

FOREIGN PATENT DOCUMENTS

| | | |
|---|---|---|
| WO | WO 0038074 | 6/2000 |
| WO | WO 2004/042525 | 5/2004 |

OTHER PUBLICATIONS

Ng et al., An intelligent agent for Web advertisements, Apr. 23-24, 2001, IEEE, 102-109.*

Sheth et al., Managing semantic content for the Web, Jul.-Aug. 2002, IEEE, vol. 6, 80-87.*

Chris Sherman, "Google Launches AdWords Select," Feb. 20, 2002, 6 pages.

Google Introduces New Pricing For Popular Self-Service Online Advertising Program, http://www.google.com/press/pressrel/select.html, p. 1-2, dated Feb. 20, 2002, printed on Jul. 29, 2003.

Collection of pages from www.overture.com, printed on Jul. 29, 2003.

Collection of pages from findwhat.com, http://www.findwhat.com, printed on Jul. 29, 2003.

Collection of pages from Sprinks.com, http://www.sprinks.com, printed on Jul. 29, 2003.

Collection of pages from Kandoodle.com, http://www.kanoodle.com, printed on Jul. 29, 2003.

Collection of pages from Google Advertising, http://www.google.com, printed on Jul. 29, 2003.

PCT International Search Report and Written Opinion, PCT/US06/07563, Nov. 6, 2007.

* cited by examiner

```
WIDGETCO ADVERTISER LEGITIMACY INFORMATION                          600
---- GOLD MEMBER ----

Transaction Volume Information
Rating among related advertisers:      8.2/10 - Great
        among all advertisers:         0.0041/10
User clicks:                           75,235
User click/buy ratio:                  1.3%
User click/buy ratio rating:           6.5/10 for related advertisers
                                       5.3/10 for all advertisers
Average buyer purchase:                $56.44
Total goods sold to users:             $55,204.98 -- BRONZE
Ad revenue paid:                       $4,302.75 -- GOLD History Information
Advertiser since:                      March 1, 1999 -- GOLD
Length of time compared to peers:      4.2/10
Length of time compared to all:        2.5/10
100 clicks:                            January 30, 2000
1000 clicks:                           October 23, 2002
5000 clicks:                           March 19, 2003
50,000 clicks:                         May 2, 2004

User Approval Score                    98.4% - EXCELLENT
                                       (of 35 respondents)
Last six months:                       100% (2 respondents)
Industries of approval:                Widgets, ball bearings, connectors User Complaint Score                   1.05% - OK
CLICK HERE to see user reviews Keyword bids:                          widget, ball bearings
Location bids:                         US, Canada, Great Britain, Australia
Company location:                      US, Canada

ADVERTISEMENT CONTENT RATINGS

Adult content:                         0.3% - Negligible
Alcohol-related content:               0.5% - Negligible
Drug-related content:                  0.0% - None General Approval Rating:               8/10
Approval Status:              Approved for general audiences
```

FIG. 6

PROVIDING HISTORY AND TRANSACTION VOLUME INFORMATION OF A CONTENT SOURCE TO USERS

FIELD OF THE INVENTION

The present invention relates to a system and method for providing a legitimacy rating of a content source associated with a document such as an advertisement.

BACKGROUND OF THE INVENTION

With the advent of the Internet, a seemingly limitless variety of content has become available to users. Countless websites provide information about countless subjects and sell a myriad of products to end users. The amount of information and consumer items accessible to a user appears to be limited only by the user's download speed, time, pocket book, and imagination. While the freedom to publish content and reach users over the Internet has brought forth an unprecedented amount of content, the wide variety of such content has a correspondingly wide range of quality and reliability. While many websites provide reliable information or sell quality products at competitive prices, many others provide inaccurate information, intentionally defraud users, or sell illegal wares.

In addition to harming users, disreputable content providers can also harm otherwise innocent referring websites by association. For instance, if one website refers a user to a disreputable site that harms the user, the bad experience may degrade the user's trust in the otherwise innocent referring site. Unfortunately, it is practicably impossible to monitor the quality of such linked sites, especially for search engines that link to a large number of websites (e.g., by publishing keyword-triggered advertisements that link to one of many advertiser websites).

It is also difficult or impossible for users to discern between websites and advertisements from legitimate business operations with proven track records and those from fly-by-night operations that intend to acquire users' credit card numbers for nefarious purposes. Competent graphic artists can make a reputable-looking document, and there are few third-party resources to tell users the difference. The sheer number of websites on the Internet make it difficult for any independent reviewing entity to evaluate even a fraction of the existing websites, and the cost of labor for such an undertaking would be similarly prohibitive. Some rating entities such as Consumer Reports provide independent ratings of companies that advertise on the Internet, but their ratings barely cover a fraction of Internet sellers. While ratings of many content providers exist somewhere in cyberspace, their lack of centralization can make them difficult to find, and the reliability of each disparate rating entity can only be verified by yet another appeal to another independent rating entity.

Other rating websites such as www.resellerratings.com provide user ratings about a variety of etailers. However, user ratings exist only for those sites that happen to be rated by one or more users, and the quality of the ratings are only as truthful and reliable as the anonymous users who post them. Another danger with most user ratings is that disreputable sites can boost their ratings by providing falsely positive ratings as a fake user.

These and other drawbacks exist with current systems and methods.

SUMMARY OF THE INVENTION

Accordingly, various embodiments of the present invention may be directed to a computer-implemented system and method for providing a legitimacy rating of a content source. A request for a document is received. An electronic document associated with a content source is passed by a document provider in response to the request. A legitimacy rating of the content source is passed. Examples of legitimacy rating information include, for example, a history rating of the content source based on the length of time the document provider has published documents associated with the content source and a transaction volume rating of the content source based on the number of electronic documents associated with the content source that are passed by the document provider.

According to another embodiment, a computer-implemented system for providing a legitimacy rating of a content source is provided. An input device receives a request for a document. An output device passes an electronic document associated with a content source by a document provider in response to the request. The output device also provides a legitimacy rating of the content source. Examples of legitimacy rating information include, for example, a history rating of the content source based on the length of time the document provider has published documents associated with the content source and a transaction volume rating of the content source based on the number of electronic documents associated with the content source that are passed by the document provider. A processor determines the legitimacy rating of the content source based on at least one of transaction and history information associated with the content source.

According to another embodiment, a computer-implemented method for providing a legitimacy rating of a content source is provided. A request for a document associated with a criteria is received from a user. An electronic advertisement is selected based on a relevance to the criteria, wherein the electronic advertisement is associated with an advertiser. The electronic advertisement is passed to the user by a document provider in response to the request. A legitimacy rating of the advertiser is provided to the user. The legitimacy rating comprises at least one of a history rating of the advertiser based on the length of time the document provider has published electronic advertisements associated with the advertiser and a transaction volume rating of the advertiser based on the number of electronic advertisements associated with the advertiser that are passed to users by the document provider.

According to another embodiment, a system for providing a legitimacy rating of a content source is provided. An input device receives from a user a request for a document associated with a criteria. A processor selects an electronic advertisement based on a relevance to the criteria, wherein the electronic advertisement is associated with an advertiser. An output device passes the electronic advertisement from the document provider to the user in response to the request. The output device also provides to the user a legitimacy rating of the advertiser. The legitimacy rating comprises at least one of: a history rating of the advertiser based on the length of time the document provider has published electronic advertisements associated with the advertiser; and a transaction volume rating of the advertiser based on the number of electronic advertisements associated with the advertiser that are passed to users by the document provider.

According to another embodiment, a computer-implemented method for providing a legitimacy rating of a content source is provided. A request for a document associated with a concept is received from a user. An electronic document associated with a content source is selected based on a relevance to the concept. A legitimacy rating of the content source is determined. The legitimacy rating comprises at least one of a history rating of the content source based on the length of time the document provider has published documents associated with the content source and a transaction volume rating of the content source based on the number of electronic documents associated with the content source that are passed to users by the document provider. The electronic document and the legitimacy rating are passed to the user together in a single transmission in response to the request.

According to another embodiment, a system for providing a legitimacy rating of a content source is provided. An input device receives from a user a request for a document associated with a concept. A selection processor of a document provider selects an electronic document associated with a content source based on a relevance to the concept. A legitimacy rating processor determines a legitimacy rating of the content source. The legitimacy rating comprises at least one of: a history rating of the content source based on the length of time the document provider has published documents associated with the content source; and a transaction volume rating of the content source based on the number of electronic documents associated with the content source that are passed to users by the document provider. An output device passes the electronic document and the legitimacy rating together in a single transmission to the user in response to the request.

Other embodiments are also within the scope of the invention.

BRIEF DESCRIPTION OF THE DRAWINGS

FIG. 6 depicts an exemplary detailed view of a legitimacy rating according to an embodiment of the invention.

DETAILED DESCRIPTION OF EXEMPLARY EMBODIMENTS

Figure 1:
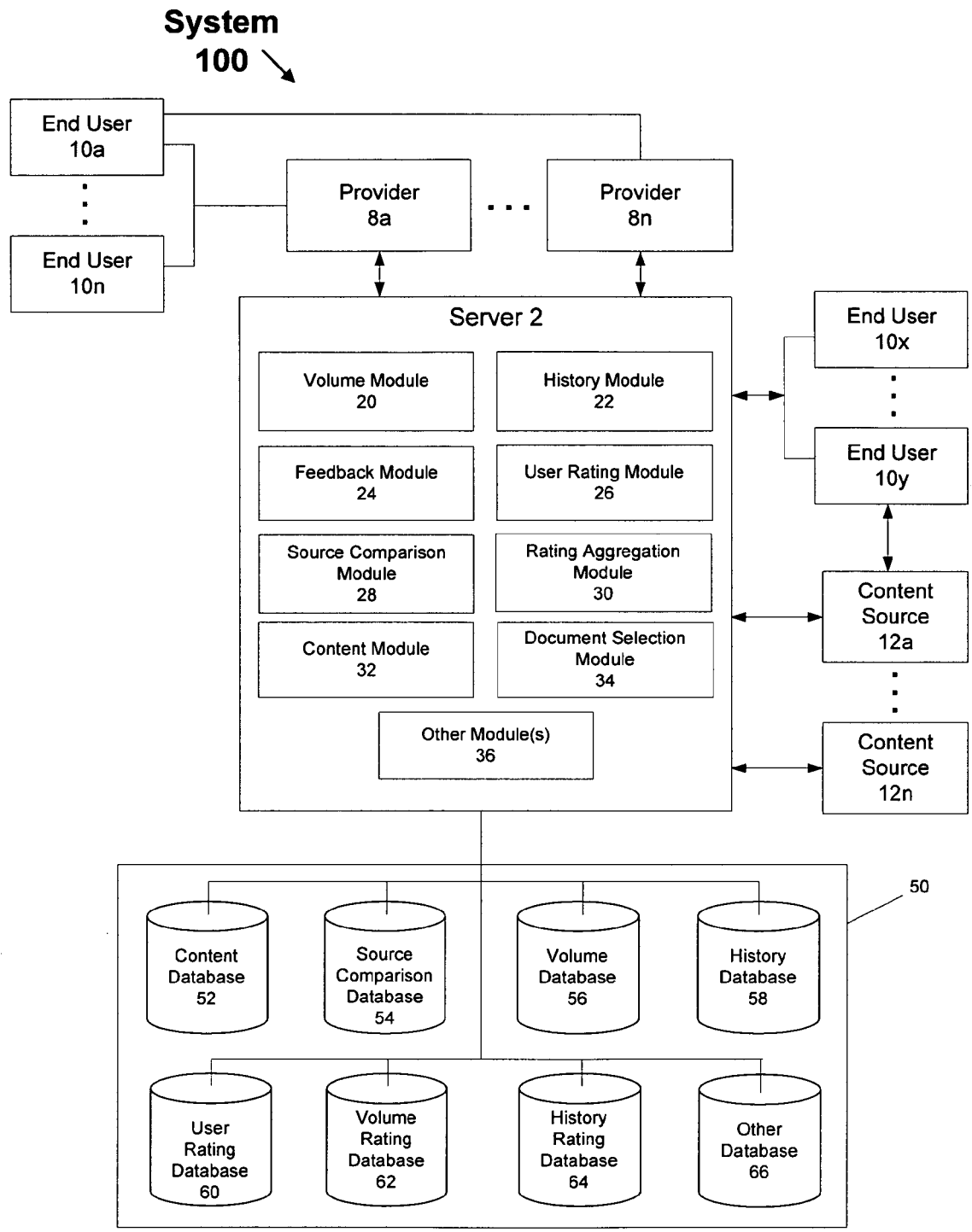
FIG. 1 depicts a system for providing a legitimacy rating of a content source according to an embodiment of the invention.

The embodiments described herein solve many problems with existing systems and methods. One problem is the lack of reliable information about content providers (also called content sources) who provide content that is published on network sites. Content providers such as advertisers may potentially harm users by selling them defective products or stealing their credit card information. Thus, users need easily accessible and reliable information about the legitimacy of such content providers.

According to various embodiments of the invention, a publisher such as a server or other content provider may provide legitimacy information about various other content sources, such as information about each content source's history and transaction volume with the publisher. In some embodiments, the publisher may provide this information whenever it publishes documents such as advertisements associated with the content source. For instance, a publisher of Internet search results and related advertisements may include legitimacy information about each advertiser at the bottom of each advertisement.

In this way, users may easily acquire unbiased factual information about content sources such as advertising businesses. This information may better equip users to decide whether to engage in relationships with content providers, such as by purchasing their products or relying on their published information. For instance, a user viewing advertisements of a variety of companies advertising automobile parts may choose to purchase from the company who has had the longest relationship with the publisher.

Another advantage of various embodiments described herein is that, to the extent that legitimacy information affects user behavior such as purchasing decisions, advertisers and other content sources will have an extra incentive to achieve and maintain a positive legitimacy rating. For instance, advertisers may seek to have a long relationship with the publisher (and accordingly achieve a stronger history rating) and also increase their transaction volume, e.g., by bidding higher amounts for Internet search keywords to increase the likelihood that their advertisements are displayed and selected by users. In some embodiments, the publisher may enable users to rate their experiences with content providers and publish the user rating information as part of the legitimacy information.

As used herein, the term "document" and "electronic document" may encompass one or more advertisements, content pages (e.g., web pages), search results, emails, applications, IM messages, audio content or files, video content or files, other files, other data or applications that may reside on one or several (e.g., a network) of computer systems, or other definable concepts or content. Although an advertisement is often used herein as an exemplary document, it should be understood that any document may be used.

This application is related to the technology described in U.S. application Ser. No. 10/841,834 entitled "System and Method for Rating Documents Comprising an Image," the disclosure of which is incorporated herein by reference in its entirety.

Overview and System Illustration

Figure 2:
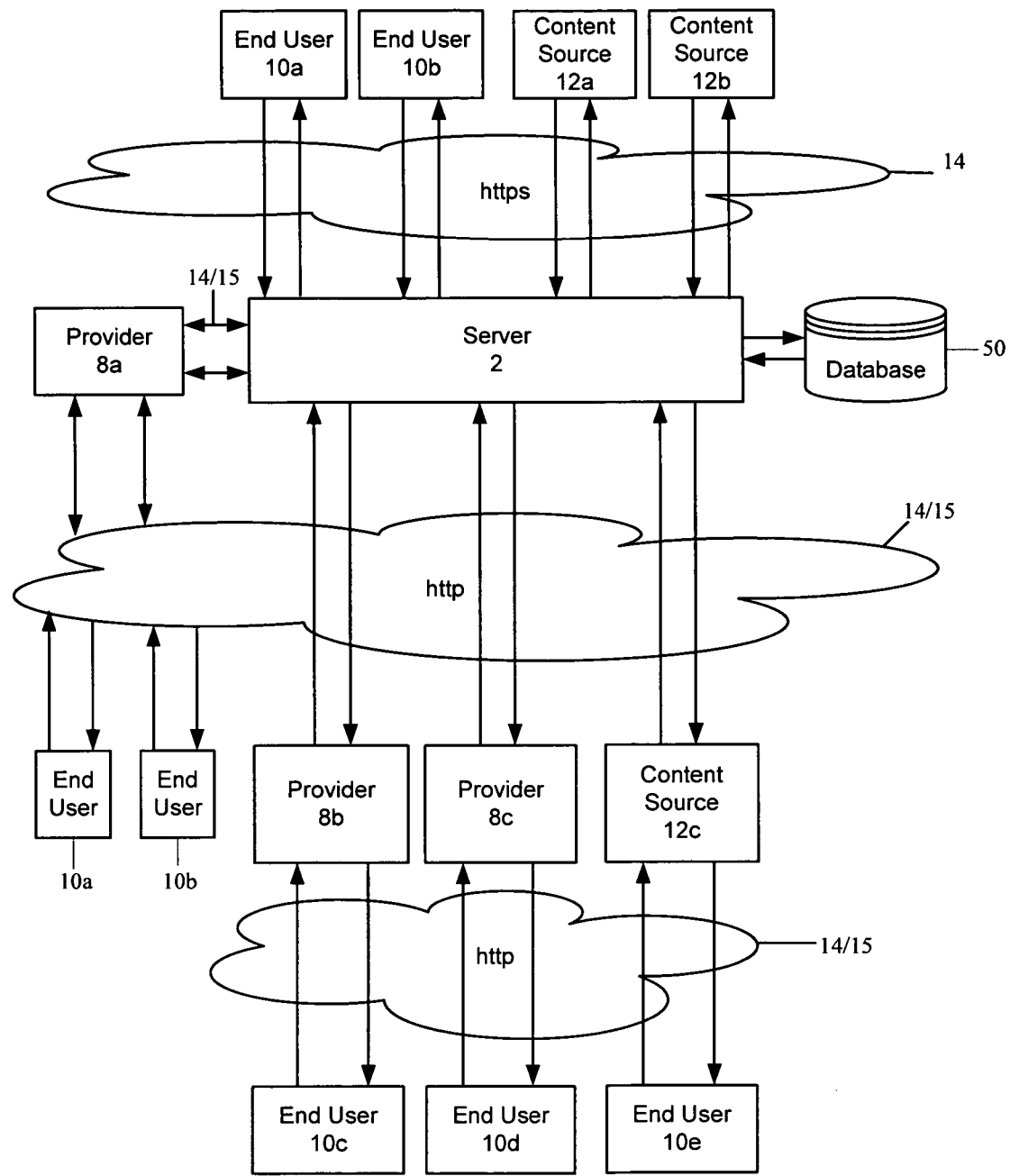
FIG. 2 depicts a networked environment for operation of a system for providing a legitimacy rating according to an embodiment of the invention.

FIGS. 1 and 2 depict an exemplary system 100 for providing a legitimacy rating of a content source 12 according to an embodiment of the invention. The system may comprise: a server 2, one or more providers 8, one or more content sources 12, one or more end users 10, and one or more databases 50 operatively connected to server 2.

Content sources 12, providers 8, and end users 10 may communicate with one or more servers 2 via electronic communication, including Internet communications. Content sources 12, providers 8, and end users 10 may include or have access to one or more servers 2 for providing functionality associated with electronic documents. Information that may be communicated between and among server 2, providers 8, content sources 12, and end users 10 may include any one or more of the following: document information, content rating information, volume information, history information, provider information, or other information.

System 100 may enable server 2 to request, receive, and/or process rating information associated with a content source 12 and/or a document (e.g., a document associated with a content source 12).

As shown in FIG. 1, one or more content sources 12 may provide content such as one or more documents to a server 2. Server 2 may also create documents, e.g., based on content received from content sources 12.

Providers 8 may provide documents to one or more end users 10a-10n. Providers 8 may comprise a content provider, search engine or other entity that makes available information, services, and/or products over an electronic network, such as the Internet. A provider 8 may include one or more of the following, for example: an advertisement listings provider, a content provider, a website host, a server 2, any other entity that provides electronic documents to users or other entities, or any other provider of content. A provider 8 may also be a content source 12.

Documents received by (or created by) server 2 may be passed to and from users 10 directly or indirectly via providers 8. For instance, a provider 8 and/or end user 10 may request a document. The requestor may transmit a signal to a server 2 that requests a document such as a web page, and that signal may be interpreted as a request for a document. For instance, user 10 may submit a search query comprising a keyword. The server 2 may pass one or more documents to the user 10 (or provider 8) based on the keyword or other criteria. The user 10 may receive the document and then provide rating information about the content source 12 associated with the document (and/or the document itself) to the server 2.

Content sources 12 may comprise any source of content, such as a server, provider, document listings provider, or any other entity that causes a document to be created or passed to another party. For instance, while one party may provide a document such as an advertisement to server 2 for distribution to users 10 under instructions from (or as a direct result of a relationship with) a second party, both the first and second parties may be considered content sources for purposes of various embodiments. In some embodiments, content source 12 may comprise an advertisement listings provider.

It should be understood that the following entities may be distinct entities: the entity that creates an advertisement (or other document); the entity that sends the created advertisement to the server 2; the entity that directs the server 2 to provide the advertisement to users; the entity that controls the company or website linked to or featured in the advertisement (or that is otherwise the subject of the ad or the entity controlling the subject of the ad); the entity that sells the advertised product to users; the entity that receives money from users for an advertised product; and the entity that pays the server 2 (or an entity associated with the server 2) for providing the advertisement to users. However, it should be appreciated that for purposes of various embodiments, these various entities may be collectively considered a single content source.

Content source 12 may provide documents to server 2, or server 2 may "pull" or retrieve documents or other content from content sources 12. For instance, the content source 12 may provide an advertisement to server 2 so that the server 2 may then provide the advertisement to one or more content providers 8 that may provide the ad to one or more end users 10. (It should be appreciated that in some embodiments, server 2 or content source 12 may provide the ad directly to the end user 10.) Content sources 12 may include any content creator or content provider 8, such as an advertisement listings provider or server 2.

The server 2 may comprise any server, hub, central processor, provider, search engine, or other entity in a network. Although a single server 2 is depicted, it should be appreciated that multiple servers 2 may be provided and that such multiple servers may share data and operational tasks to achieve efficiency and operation of the functions described herein.

The server 2 may comprise one or more modules 20-36 to process content, legitimacy information (e.g., ratings), and other data.

Volume module 20 may receive and process volume information, including any information related to the number or amount of documents (or other content) associated with a content source 12, such as an advertisement listings provider. Volume module 20 may receive and process information about one or more of the following, for example: the publication of a document associated with a content source 12, e.g., by server 2; a user 10 selection of a document associated with a content source 12, such as a document published by server 2; a user 10 purchase from a content source 12 (including an entity associated with the content source 12), such as a purchase made after selecting a document associated with the content source 12; the number of documents received at (or created by) the server 2 that are associated with a particular content source 12. For instance, volume module 20 may use a counting or aggregating function to monitor the number of times a particular advertisement is selected in order to determine the total number of times it is selected.

Volume module 20 may communicate with providers 8, users 10, and content sources 12 to acquire such information. Volume information may be stored in volume database 58.

History module 22 may receive and process history information. History information may comprise any information related to one or more of the following, for example: the length of time a content source 12 has provided content to the server 2 (or otherwise provided content); the length of time the server 2 has distributed content related to the content source 12; the length of time a content source 12 has been in business; the length of time a content source 12 has been associated with a particular country or geographical location; the amount of time that passed before a particular document (or type of document) associated with a content source 12 was published or selected by users a certain number of times (e.g., the time it took for the first 1000 clicks on an advertiser's ad or ad campaign); or other historical information related to the content source 12 and its associated documents. History module 22 may communicate with providers 8, content sources 12, users 10, and third party entities to acquire such information.

Figure 5A:
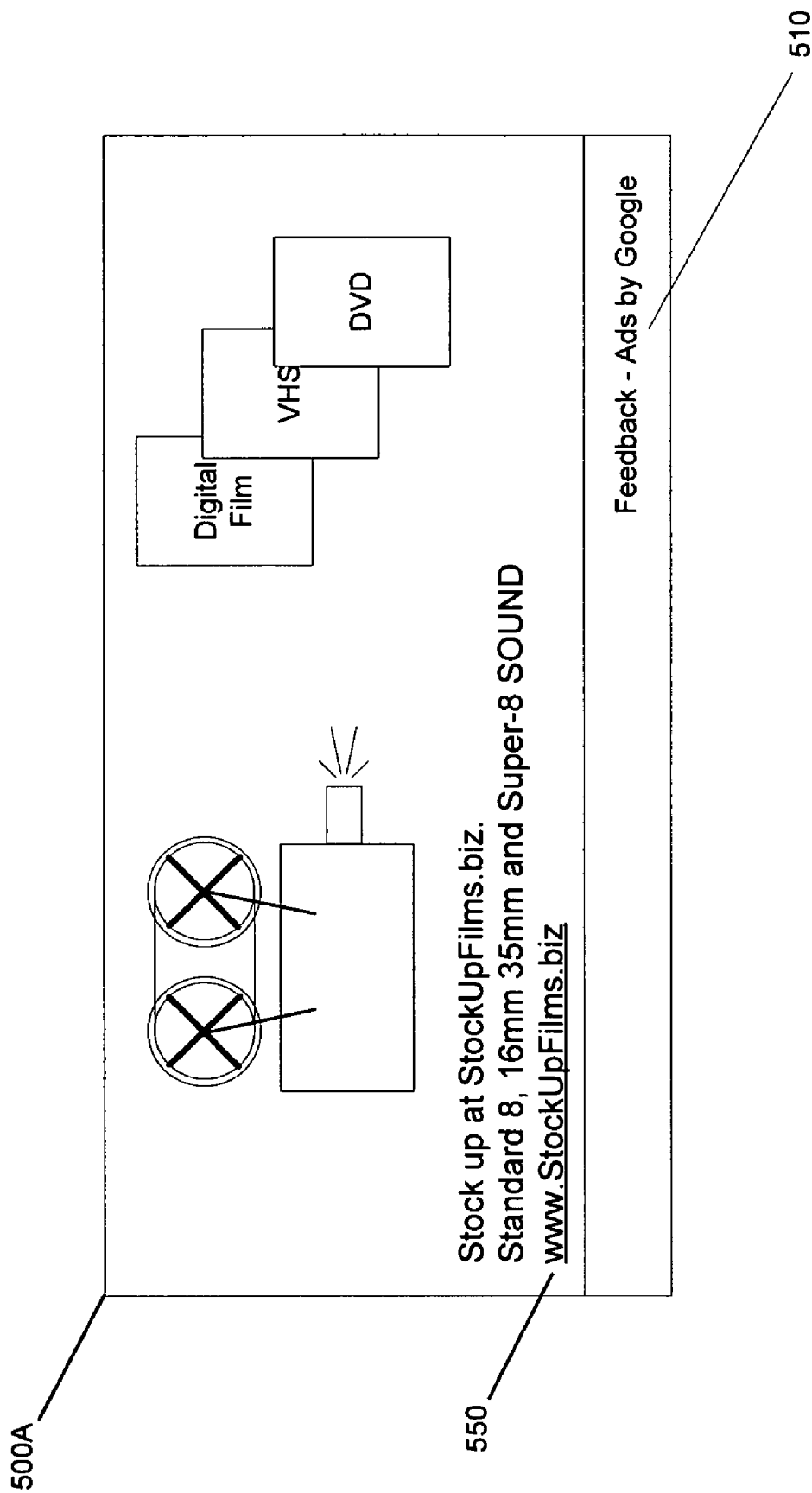
FIGS. 5A and 5B depict an exemplary document for which legitimacy rating information may be provided according to an embodiment of the invention.
Figure 5B:
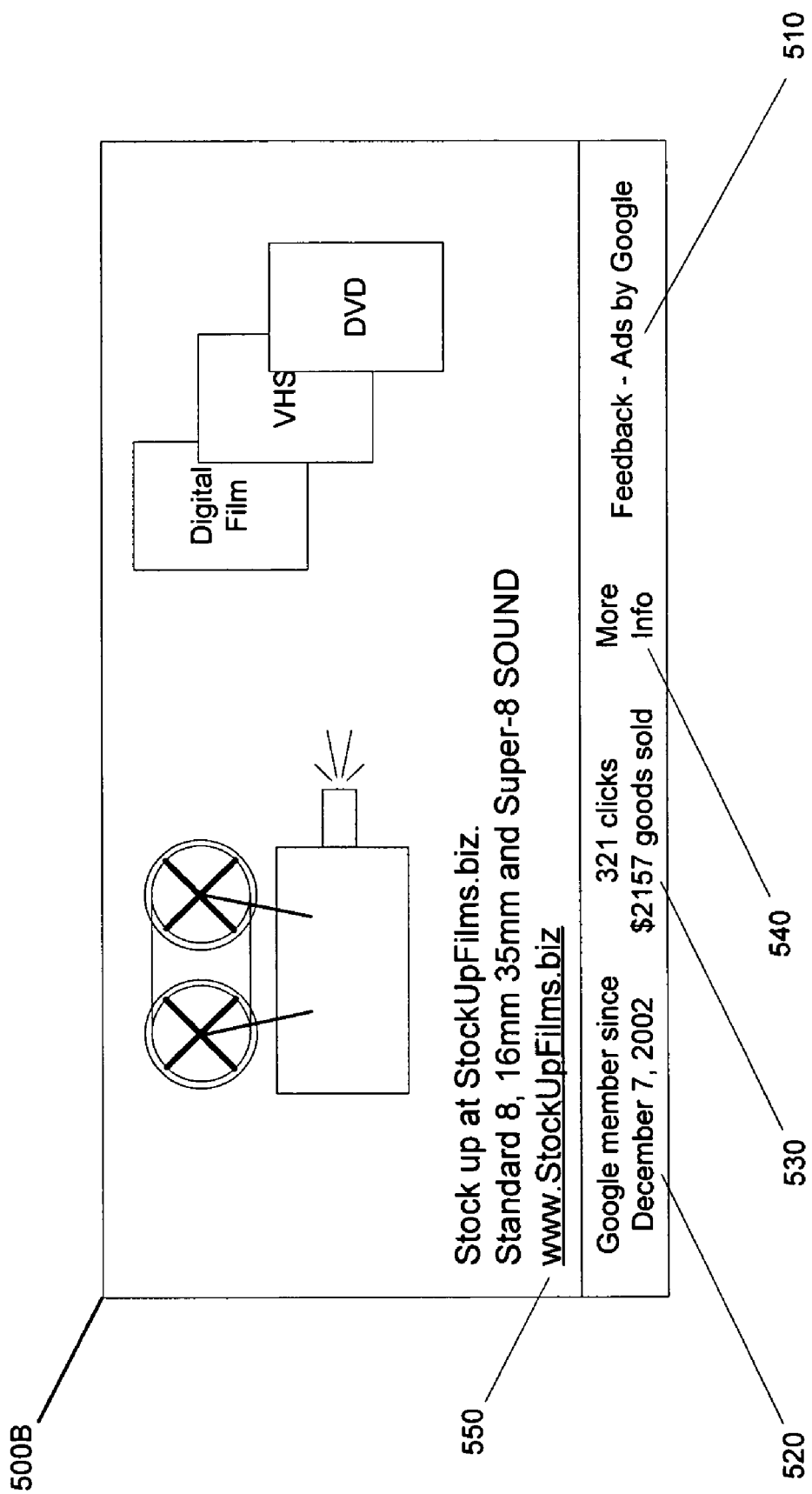

Feedback module 24 may receive and process user feedback information, e.g., information received via a feedback link in a document such as an advertisement (e.g., as shown in FIGS. 5A and 5B).

User rating module 26 may receive and process content ratings received from end users and other evaluators. User ratings and user rating requests may be communicated via traditional mail, email, or other methods. For instance, a document associated with a content source 12 may include a feedback link for providing a user rating. The feedback link may link the user to a feedback document that requests evaluation of specific features of the document or its associated content source 12, such as the quality of the user's experience of the content source 12, the truthfulness and reliability of the content source 12, the appropriateness of content of the content source 12, the dollar amount the user 10 has spent on products provided by the content source 12, the length of time the user 10 has known about or had a relationship with the content source 12, and other criteria. The end user 10 or other evaluator of content sources may then pass the user rating information to the server 2, e.g., by completing a feedback document hosted on the server 2 site. The user rating module 26 may then electronically process the rating information.

The server 2 may also use other methods to request a user 10 to provide information about an advertiser (or other content source 12) associated with a particular document such as an advertisement.

Source comparison module 28 may process content source 12 information in order to associate one or more content sources 12 with one or more other content sources 12. Associations may be based on similarities between and among the content sources 12.

For instance, for content sources 12 that are advertisers who bid on specific keywords wherein the highest bidder will have their ads displayed in a highest position on a search result page when those keywords are submitted to an Internet search engine, source comparison module 28 may associate together the content sources 12 that bid on the same keywords or keywords that are related (e.g., closely related) in semantic space. In other words, source comparison module 28 may associate together all the advertisers 12 who bid on the phrase "cellular phone," and it may also include in such association all the advertisers who bid on the words "mobile phone," "wireless," and "wireless handset".

Source comparison module 28 may also determine a degree of association between a plurality of content sources 12. For instance, two advertisers who bid on the exact phrase "cellular phone" may have a correlation factor of 1.0, while these advertisers may have a correlation factor of 0.85 to those advertisers who bid only on "wireless handset," a correlation factor of 0.95 to those who bid on both "cellular phone" and "wireless," and a correlation factor of 0.5 to those advertisers who bid on "wireless" and "phone antenna." Thus, the degree of association (or correlation factor or other metric) may be based on the degree of association between keywords (from keyword bids) in semantic space.

The correlation metric may also be based on an advertiser's actual bid (or relative bid) on a keyword. For instance, advertisers who bid $0.50 on the keyword "wireless" may have an increased correlation factor. In some embodiments, advertisers who each bid on several different keywords may have a higher degree of association to the extent that their highest bids were for the same or similar words (and/or their next highest bids were for similar words, and/or the third highest keyword bids, etc.).

It should be appreciated that a single content source 12 such as an advertiser may effectively have several different ratings and correlations. In some embodiments, an advertiser 12 or other content source 12 may bid on keywords, wherein the ad will be selected for display to a user on a search result page based on the amount of their bid and the degree of association between their keyword and the user's search query. An advertiser with advertisements for a variety of completely different products (each having different concept or keyword monetary value bids) may have separate ratings for each set of keyword bids. Thus, in some embodiments, a single content source 12 may be effectively treated as several different content sources 12, each with separate ratings. For instance, the volume ratings for each distinct "entity" of the single content source 12 may be completely different, and each "entity" may be associated with a different set of other content sources 12. However, it should be noted that some of the history information for the various "entities" of a single content source 12 may be the same, since some time measurements may be based on the length of time the server 2 has had a relationship with the content source 12 (which may be considered the same (or different) for all distinct "entities").

Other factors that may be taken into consideration in determining an association between different content sources 12 include, for example, one or more of the following factors in regard to each content source 12: geography (e.g., location of headquarters of an advertiser); industry (e.g., the industry of an advertiser as specified by the advertiser); language (e.g., English-language content may be distinguished from Spanish-language content); number of advertisements; history information (e.g., length of time an advertiser has been in business or length of time the server 2 has published the content provider's content); volume information (e.g., the number of ads published by the server 2); type of content provided by the content source (e.g., image ad providers may be treated differently from text ad providers and pop-up providers); content (e.g., the words and images comprised in an advertisement, such that content providers 12 with text ads having similar language or image ads having similar language may have an increased correlation); and other factors.

Correlation factors or other metrics based on a degree of association between content sources may be used by the rating aggregation module 30 to compare a particular content source 12 to "related" content sources.

Rating aggregation module 30 may aggregate or otherwise process rating information for one or more content sources 12 and determine aggregate volume, history, and user ratings for each content source 12.

It should be appreciated that ratings may be based on absolute ratings as well as normalized ratings. For instance, while a highest score in a particular category such as transaction volume may be $750,271, this amount may be normalized as 100%, 10, or 1.0 (among other normalizations). It should also be appreciated that aggregate ratings may use means, modes, medians, standard deviations, and other statistical comparison tools and measurements.

An aggregate rating for a particular content source 12 may be based on rating information for the particular content source 12 as well as ratings of other content sources 12 related to the particular content source 12 (e.g., content sources determined to be related by the source comparison module 28). For instance, a content source rating may be based on the average content source rating of related content sources. Any comparisons to related content sources may be based on a weighted average calculated based on a degree of correlation between the content source 12a in question and each of the comparison content sources 12b-n.

The rating aggregation module 30 may determine an aggregate rating for a content provider by processing ratings created by rating modules 24, 26, 30. The rating aggregation module 30 may use any aggregation algorithm or methodology to determine aggregate ratings. For instance, the aggregation may be a total score, a mean, a mode, a median, a step function, a $75^{th}$ (or other) percentile score, or any other measure that relates to the data considered. The algorithm may consider one or more of the following, for example: volume information, history information, user ratings, document performance data (such as click through rate and frequency of display), and other information relevant to the end users (or other evaluators of content or content providers), document, document content, or aggregation.

An aggregate rating may comprise one or more distinct numerical scores (e.g., for different subject areas like volume and history). Ratings may also comprise one or more binary scores (such as yes/no or flag/no-flag). The numerical scores may comprise one or more measures of a total rating in a particular area, and the numerical scores may also indicate other information about the various ratings aggregated. For instance, a score may comprise a mean in addition to a standard deviation of the mean. The aggregate rating may also comprise (or be computed using) a multidimensional vector.

Content module 32 may receive and process content received from content sources 12. Content module 32 may also create documents based on content received from content sources 12. For instance, content module may receive ads from advertisers and/or create ads based on content received from advertisers.

Content module 32 may store such received and/or created documents and other content in content database 52. The ads or other documents received or created by content module 32 may be passed to providers 8 and end users 10.

Document selection module 34 may select one or more documents and pass them to providers 8 and/or end users 10. Document selection module 34 may select and provide such documents in response to a request from a provider 8, end user 10, or other entity. For instance, document selection module 34 may select a document in response to a keyword search query from a user 10.

Document selection module 34 may select a document from the content database 52. For instance, document selection module 34 may select a document provided by a content source 12 or created by server 2, and/or it may select (and/or create) one or more search results, wherein each search result is associated with a content source such as a website. The document may be selected based on one or more of the following, for example: its relevance to a criteria, such as a keyword provided in a search query; an amount of a bid on one or more keywords; user rating information; legitimacy information; or other criteria. For instance, document selection module 34 may receive a search query from a user 10 and provide a plurality of search result and advertisement documents on a website document, which it may then pass to the user 10.

Document selection module 34 may pass documents created or selected by the module 34 to users 10 and providers 8. Document selection module 34 may also pass legitimacy information associated with the document (and/or associated with a content provider associated with the document), such as information created by volume module 20, history module 22, user rating module 26, and rating aggregation module 30. The legitimacy information may be passed together with the document. For instance, the legitimacy information may added to the document (e.g., at the bottom of the document or as a visible attachment to the document). The legitimacy information may also be embedded in code associated with the document, such that the information is not displayed with the document but may be accessed by the user via alternate means, such as by right-clicking on the document (or an icon associated with the document) or mousing over the document (or otherwise selecting the document or a link or other entity associated with the document).

It should be understood that for search result documents, document selection module 34 may identify legitimacy information based on a link associated with the search result document. For instance, if www.movies.com is a search result for the query "best movies of 2004," document selection module 34 may access database 50 to determine if any legitimacy information exists for www.movies.com. If it does, it may provide the legitimacy information to a user as described herein.

Other module(s) 36 may accomplish other functions related to providing volume and history information.

A database 50 coupled to the server 2 may include one or more databases 50-66. The server 2 and its modules 20-36 may store and access information stored in the database(s) 50-66. Databases 52-66 may comprise portions of a single database 50. It should be appreciated that the databases 50-66 may or may not be physically distinct.

Content database 52 may store content such as documents and other content received from content sources 12 and documents created by server 2. The content may be provided to users 10 and providers 8 by server 2, e.g., when a user 10 requests a document by submitting a keyword at a search engine. The documents may be associated with their originating content sources 12, e.g., the content source 12 that provided the document or provided instructions or content giving rise to the document. For instance, a content source 12 may provide instructions to the server 2 to create a document. A document created by the server 2 in response to these instructions may be associated with that content source 12.

Source comparison database 54 may store information about one or more content sources 12, including content source 12 correlation and association information. For instance, content source database may store information indicating which content sources 12*b-n* are similar to a particular content source 12*a*, and the degree of similarity between and among the content sources 12*a-n* along a plurality of metrics. In particular, source comparison database 54 may store information used or created by source comparison module 28.

Volume database 56 may store volume information for one or more content sources 12, including volume information received from the volume module 20. Volume rating information may comprise any transaction or other information that may be used by volume rating module 24 in determining volume rating information. For instance, volume database 56 may store numerical information relating to the number of occurrences of a particular event, such as: a user selection of a content source's 12 document; an accumulated amount of money such as the amount paid by a particular content source to the server 2 (or an entity associated with the server 2) over the course of a year or the lifetime of their relationship; or another amount.

History database 58 may store history information for one or more content sources 12, including history information received from the history module 22. History information may comprise any information that may be used to determine a time or length of time, or other information that may be used by the history rating module 26 in determining history rating information. For instance, the first time a user 10 selects a document provided by a particular content source 12, information about this event may be recorded in the history database 58. This information may include: the identity of the content source; the identity of the selected document; keywords associated with the document (including keyword bids by the content source as well as keywords entered by the user for a search query, if any); the date and time of the selection; and other information concerning the selection. Similar information may be stored for other events.

User rating database 60 may store user rating information, such as ratings concerning the quality of a content source 12 and other rating information used or created by user rating module 26 and rating aggregation module 30. For instance, when a rating of a content source 12 is received by server 2, the content of the rating may be stored here.

Volume rating database 62 may store volume rating information, including information used and created by volume rating module 24 and rating aggregation module 30.

History rating database 64 may store history rating information, including information used and created by history rating module 26 and rating aggregation module 30.

An aggregate rating database 48 may store aggregate ratings. Each aggregate rating may include ratings across a variety of criteria.

Other database(s) 54 may store other information relating to the providers 8, end users 10, content sources 12, server 2, volume information, history information, ratings, and aggregate ratings, and other content.

Illustrative System Network Environment

FIG. 2 depicts a networked environment for operation of a system for providing a legitimacy rating according to an embodiment of the invention. In such an environment, content sources 12 and providers 8 may connect over a network 14, 15 to a server 2 (e.g., using a secure https connection) to provide documents and rating information (e.g., legitimacy rating information) to server 2 and to receive documents and rating request information from server 2. The server 2 may store the document and rating information in a database 50. The server 2 may distribute the documents through various forums or feeds, including direct distribution in print media, providing the documents on one or more web sites affiliated with the server 2 and through providers 8. It should be noted that providers may comprise syndication partners of the server 2 (e.g., connected over network 14 or 15 depending on security desired), content systems (e.g., with associated content databases) and search engine systems operated by the server 2 or provider(s) 8.

Through these various forums, the documents provided to the providers 8 may be included in pages (or other documents) displayed to end-users 10 (often called an impression).

Each of server 2, providers 8, and content sources 12 may comprise computerized systems that include one or more of the following systems, for example: a web server 2, a database server 2, proxy server 2, network balancing mechanisms and systems, and various software components that enable the system to operate on the Internet or other network type system. Additionally, networks 14 and 15, although depicted as http networks, may comprise other networks such as private lines, intranets, or any other network. In an exemplary embodiment, the connection between a content source 12 such as an advertisement provider and server 2 (and other connections such as between a provider 8 and server 2) may comprise secure network connections to insure that data is not subject to attack or corruption by any hacker or other third party. In addition, whereas two content sources 12 are depicted, it should be appreciated that one or more content sources 12 may be provided in the network. Similarly, although one database 50 is depicted, it should be appreciated that multiple database 50 may be provided and that such database 50 may be connected to the server 2 via any type of network connection, including a distributed database server 2 architecture.

Similarly, provider 8a may comprise any number of such systems connected to the server 2 via any type of network, including an http or https network. Provider 8 may comprise a system such as server 2 that provides functionality for enabling connection over the Internet or other network protocols. Providers 8 may comprise any system that distributes content such as advertising to end-users 10.

End users 10 may comprise any user (such as users connected to the Internet) and may comprise computerized systems that enable that connection through any of various types of networks, including through Internet service providers, cable companies, and any other method of accessing data on the Internet.

Illustrative Process

Figure 3:
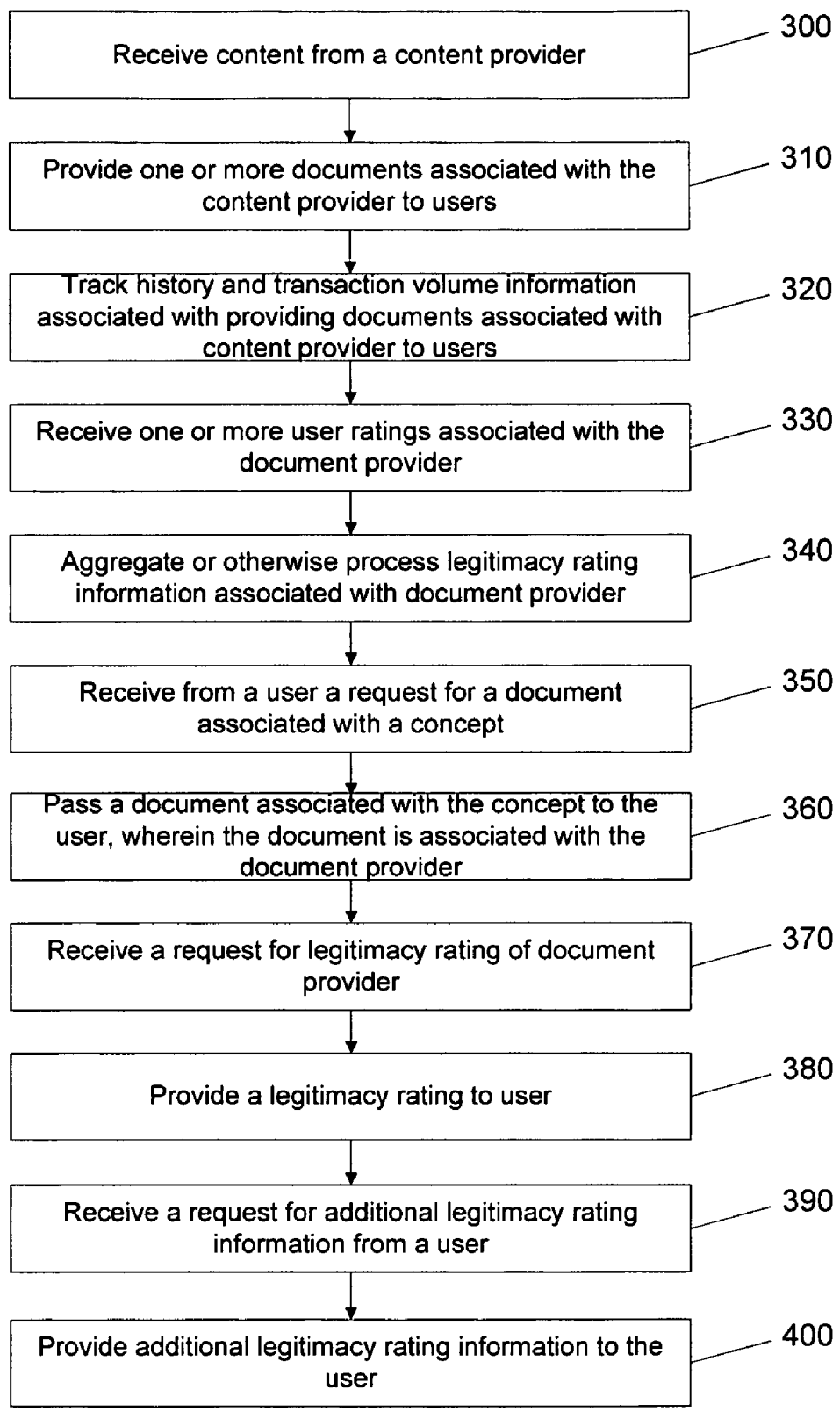
FIG. 3 depicts a flow chart illustrating an exemplary method for providing a legitimacy rating according to an embodiment of the invention.

FIG. 3 depicts a flow chart illustrating an exemplary method for disclosing a legitimacy rating according to an embodiment of the invention. The methods described herein may be implemented by the systems described in FIGS. 1 and 2.

In block 300, content may be received from a content provider. The content may be received from a document provider such as a server. For instance, an advertisement or request to produce an advertisement may be received from an advertiser or advertiser agent. Alternately or in addition, the server 2 may generate one or more documents. For instance, a content source may provide instructions to the server 2 to generate an advertisement for the content source.

In block 310, one or more documents associated with the content provider may be provided to users. They may be provided to users by a document provider, such as a server. For instance, a plurality of different ads associated with a particular advertiser may be passed to a plurality of different users over time.

In block 320, transaction and/or history information associated with the content provider may be tracked, e.g., by the server. For instance, the server may monitor how many times it publishes a document that is associated with the content provider. The server may also monitor how many times a user selects a document associated with a content provider such as an advertiser, e.g., by clicking an advertisement of the advertiser. The server may also store the date of any of these occurrences.

For example, the server may determine the number of times a particular advertisement associated with an advertiser has been provided to (or selected by) users. It may also determine the total number of times any advertisements associated with the advertiser have been provided to (or selected by) users. Using cookies, it may also monitor the number of times those users made purchases after selecting a particular document.

In block 330, one or more user ratings associated with content providers (such as the content provider of 320) may be received, e.g., by the server. For instance, an end user or other evaluator may elect to provide rating information, e.g., by clicking on a feedback link in the document (e.g., as shown in FIGS. 5A and 5B). The feedback link may direct the evaluator to a site (or other location in cyberspace) where the evaluator may provide rating information. For instance, the feedback link may direct the evaluator to a site which prompts the evaluator for various rating information (see, e.g., FIG. 7). Rating information may be input at the prompts.

For instance, users may leave feedback about their experience with a particular content provider associated with an advertisement or other document provided by the server. Some users might complain about the content provider. For instance, some users may indicate that a particular advertiser sold a falsely advertised product and/or overcharged them for a purchase. Any variety of consumer complaints are contemplated herein.

Other users may leave feedback indicating positive experiences with a content provider, such as an indication that information provided by the content provider was accurate and reliable, or that an advertiser processed an order quickly and had good customer server.

Feedback information and the methods of obtaining it may comprise any feedback information from users or other parties as discussed in U.S. application Ser. No. 10/841,834 entitled "System and Method for Rating Documents Comprising an Image," the disclosure of which is incorporated herein by reference in its entirety.

In block 340, legitimacy rating information and/or user rating information may be aggregated or otherwise processed, e.g., by the server.

For instance, the server may determine aggregate user and/or legitimacy ratings for a particular advertiser or other content provider. For instance, mean, median, and mode rating values of a particular content provider may be compared to those of other content providers, such as all or a subset of content providers who provide content to the server, to determine an aggregate rating for that content provider.

One relevant subset of content providers for comparison may comprise content providers who have a relevance or similarity to the particular content provider. For instance, an advertiser who advertises cars may be compared to others advertisers who advertise cars or other advertisers in the automobile industry. A content provider who has had a relationship with the server for two years may be compared to other content providers who have had relationships with the server for 2 years (or more or less). An advertiser may be compared to other advertisers who have a similar transaction volume. In other embodiments, advertisers who bid on one or more identical or similar keywords may be compared to one another.

For instance, the server may determine that advertisements from one particular advertiser were selected by users 300 times over the course of a year, while advertisements from other comparable advertisers were selected by users an average of 500 times for each advertiser, wherein the standard deviation is 100 and the maximum is 1500. The server may use statistical methods to determine a metric for measuring each advertiser's selection score on a scale of 1-10, and it may determine that the particular advertiser earned a 2.8 rating.

Using similar methods, the server may determine that an advertiser who has had a relationship with the document provider for 5 years (compared to an average of 8 years for similarly situated advertisers) has history rating of 6.5/10.

Similarly, the server may determine that an advertiser who has paid $75,000 to the server (or an associated entity) for publishing its advertisements to users (compared to $40,000 average) has an advertisement payment rating of 9.1/10.

In block 350, a request for a document associated with a concept may be received from a user, e.g., by the publisher. For instance, a user may enter a search query such as "best movies of 2004" at a search engine website such as Google™ to request documents associated with the query.

Figure 4:
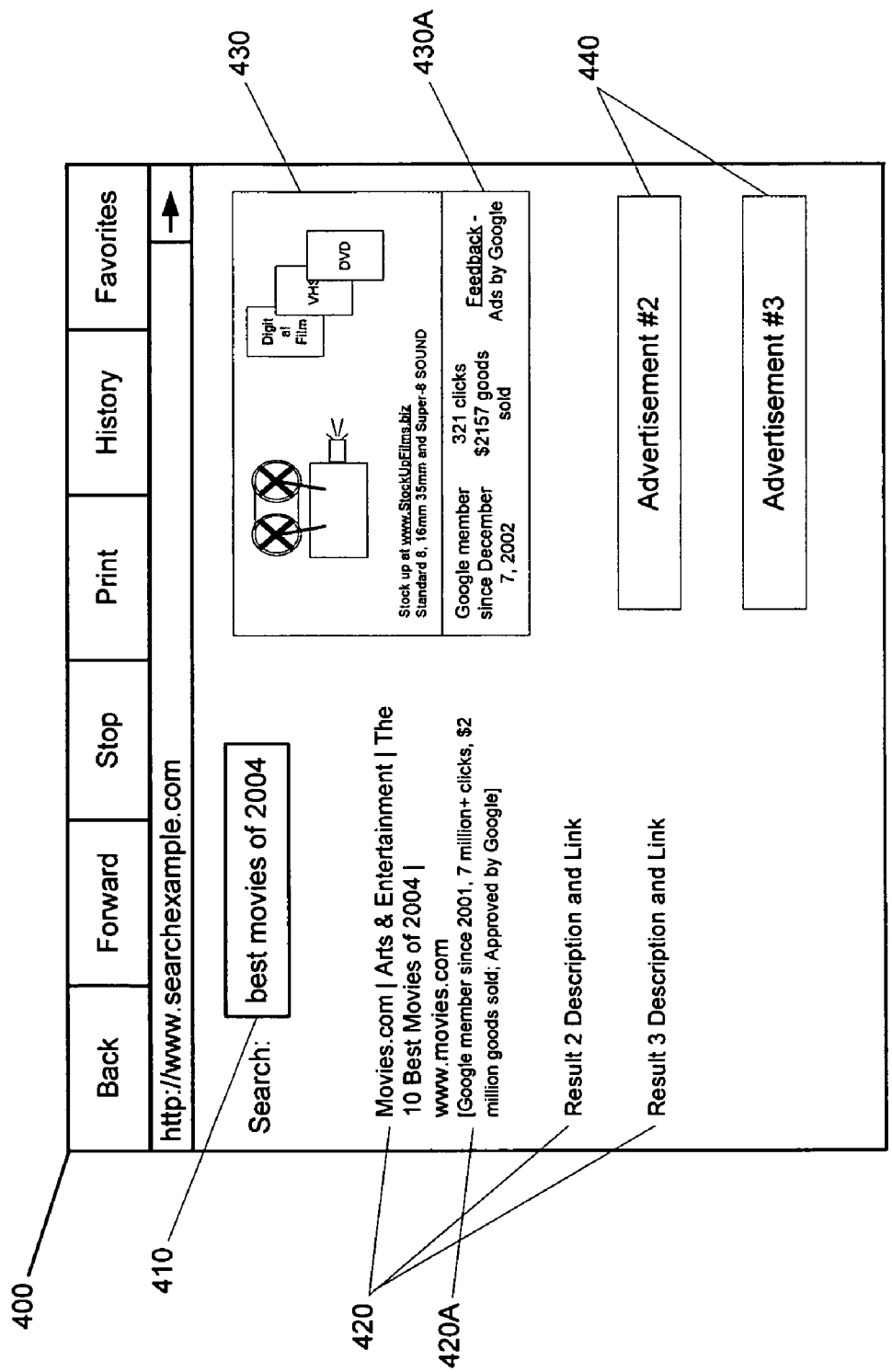
FIG. 4 depicts an exemplary web page containing a document comprising legitimacy rating information according to an embodiment of the invention.

In block 360, one or more documents associated with the concept may be passed to the user. For instance, a list of search results and advertisements may be provided on a search result page (e.g., as shown in FIG. 4), wherein each search result and advertisement is related to a search query provided by a user. Each document may be associated with a content source; for instance, a merchant may be associated with each advertisement, and a company may be associated with each website linked in a search result.

The documents may comprise legitimacy information and user rating information. For instance, the documents may comprise the documents shown in FIGS. 5A and 5B. Thus, it should be appreciated that the actions of block 360 (passing document to user) may be combined with the actions of block 380 (passing legitimacy rating to user) if legitimacy information is comprised in the document.

In block 370, a request for legitimacy information (or additional legitimacy information) associated with a document (or content provider) may be requested by the user. If the provided document already contains or shows legitimacy information, this action may comprise requesting additional legitimacy information, such as by clicking a link to more legitimacy information. It should be understood that any of a variety of actions may be considered a request for a legitimacy rating. In some embodiments, a user may mouse over or otherwise select a particular document and thereby cause legitimacy information to appear in the document or in another document.

In block 380, a legitimacy rating of a document provider (or other content source) may be provided to a user, e.g., by the server. The legitimacy information provided may comprise additional legitimacy information if legitimacy information was already displayed to the user. The legitimacy rating may comprise any legitimacy information described above, such as information relating to the length of time the content provider has provided documents to the server 2 or the number of times users have selected the content source's documents. The legitimacy information may also comprise any user ratings and aggregate ratings as described herein, such as aggregate user ratings, aggregate history rating information, and aggregate volume rating information. The aggregate ratings may also comprise a general approval or disapproval based on that information. Legitimacy information may also comprise user rating information.

Legitimacy information may be provided automatically or in response to a request from the user (e.g., as indicated in block 370). For instance, each document may comprise legitimacy rating as part of the document, such as in advertisement 430. In other embodiments, legitimacy information for a document may be downloaded and displayed on the user's computer in response to the user selecting a link 540 to a legitimacy rating document 600. In other embodiments, a user selection of the document shown in FIG. 5A may cause the server to provide the legitimacy information shown in FIG. 5B.

It should be appreciated that the legitimacy information may be provided to the user's computer before it is displayed to the user. For instance, in some embodiments the legitimacy information may be stored in a temporary Internet file (or cookie, etc.), and then the legitimacy information may be displayed once the user selects the document by mousing over or clicking on it. In some embodiments, the legitimacy information may be a part of the document itself, such as in 410 and 500B.

It will be appreciated to those skilled in the art that the acts described above may be performed by hardware, software, or a combination thereof, with or without human intervention, as may be embodied in one or more computing systems such as a server 2 system coupled to entities such as providers and end users. Further, it should be appreciated that not all of the blocks must be accomplished. For instance, in one embodiment, the method may begin at block 340 and end at block 380. Also, it is not necessary that the action(s) of each block be performed in the order shown in FIG. 3. Any order of performance may be considered.

Illustrative User Interface and Results

FIG. 4 shows an exemplary documents 400, 430, 440 according to an embodiment of the invention. FIG. 4 depicts an exemplary web page 400 search result from an Internet search engine comprising a search query 410, search results 420 (e.g., comprising legitimacy information 420A), an advertisement 430 comprising legitimacy information 430A, and other advertisements 440. The advertisements 430, 440 may comprise a banner ad, another ad that can be displayed on a web page, or another graphical or text advertisement that can be displayed via electronic means.

It should be noted that the web page 400 itself may be a document, and the advertisements 430, 440, search results 420, and other content on the page 400 may also be documents for purposes of various embodiments. Although advertisements 430, 440 and search results 420 are shown in FIG. 4, other types of documents may be considered, such as pop-ups, files, programs, and other information. The documents 400, 430 may have various types of content. For instance, the document may have words, images, sounds, and other information, as well as functions or programs which may dynamically produce words, images, sounds, and other information.

Here, the keyword search query 410 "best movies of 2004" may return search results 420 as well as advertisements 430, 440 related to the search query 410. For instance, server 2 may comprise a search engine that returns search results 420 and advertisements 430, 440 that are related (e.g., by subject matter) to the search query 410. The advertisements may be ordered on the right side of the document based on their relevance to the search query as well as a bid on specific keywords. The advertisement 430 may be for the a company called www.StockUpFilms.biz, and the advertisement 430 may be in the top advertisement position because its associated content source (e.g., the company www.StockUpFilms.biz) bid a high amount on the keywords "movies 2004."

Legitimacy information 430A may comprise volume and/or history information related to the source of the advertisement (e.g., an entity who created the document, instructed to have the document published, or an entity otherwise associated with the document). For example, legitimacy information 430A may indicate one or more of the following, for example: that the advertiser (or other associated content source) has had a relationship with the search engine since Dec. 7, 2002; that this advertisement (or other advertisements from this advertiser) have been selected by users a total of 321 times; and that a total of $2157 of goods have been sold to the users who clicked on the ad.

Legitimacy information may also be indicated in the document in other ways. For instance, the bottom portion of the document showing the legitimacy information 430A (or the legitimacy information itself, such as a dollar amount) may be colored gold to indicate that the advertiser is a highly rated "gold" member, while other advertisers may have other associated colors such as bronze or platinum to indicate a lower or higher rating, respectively. Different pieces of legitimacy information may have different associated colors. For instance, a new advertiser with a high user transaction volume may have "bronze" (e.g., relatively weak) history information but and "platinum" (superior) volume information, indicated by colors or labels associated with such information. In other embodiments, a sound file such as a voice clip may provide an audio indication of the legitimacy information, such as by stating "321 user selections" or "www.StockUpFilms.biz is a bronze advertiser."

Here, the legitimacy information 430A may also comprise a link for users to provide feedback about the advertisement or advertiser (or document or other content source). Although not shown in FIG. 4, the other advertisements 440 may also comprise similar legitimacy information for their respective content sources.

FIGS. 5A and 5B depict exemplary documents 500A and 500B for which legitimacy rating information may be provided according to an embodiment of the invention. The documents 500A and 500B may comprise a feedback link 510 and advertiser link 550. Document 500B may also comprise legitimacy information 520, 530 and a legitimacy link 540 that links to additional volume and/or history information (e.g., a link to the document shown in FIG. 6). The documents 500A and 500B may be comprised in a web page, such as in the search result page shown in FIG. 4.

Here, documents 500A and 500B are advertisements, although the documents 500A and 500B may be any type of document, such as an email, web page, pop-up, graphic, search result, or other document. FIG. 5A shows a document 500A being displayed without explicit legitimacy rating information, and FIG. 5B shows the same (or similar) document 500B showing explicit legitimacy rating information including history information 520 and volume information 530.

The document 500A in FIG. 5A may contain embedded volume and history information that is displayed when the document is selected by a user, such as when a user mouses over the document 500A, right-clicks on the document, or otherwise selects the document.

The feedback link 510 may enable users to provide feedback information about a document or associated content source, as described elsewhere herein.

The advertiser link 550 may comprise a link to another document, such as the web page URL of the advertiser (e.g., or content provider or content source). For instance, the advertiser link 550 may comprise an embedded hypertext link, and the embedded link may be associated with the advertiser link 550 displayed in the image of the document 500A, 500B. In some embodiments, selecting (e.g., clicking on) the displayed URL or other link 550 while viewing the documents 500A, 500B (e.g., in a web browser) may direct the viewer's mechanism for viewing documents (e.g., web browser) to the content associated with the link (e.g., the advertiser's web page).

The documents 500A, 500B may explicitly display the advertiser link 550. Also, the advertiser link 550 may be embedded in the document (e.g., in the programming of the document) or a portion thereof such that the link 550 is not visible. Here, selecting (e.g., clicking on) the documents 500A, 500B may direct a user's document viewing mechanism to the linked document(s). The document 500A, 500B may also comprise one or more additional links. For instance, an ad that advertises a plurality of products may comprise a link for each product, wherein selecting (e.g., clicking on) an image, icon, or text in the document 500A or 500B relating to a specific product (or other content) may direct a web browser (or other document viewing mechanism) to a page at a merchant's site associated with the specific product (or to another document). It should be appreciated that in such embodiments, the document may display (or enable the display) of separate (or combined) legitimacy information for each separate product or link.

FIG. 6 depicts a document 600 comprising an exemplary detailed view of a legitimacy rating according to an embodiment of the invention. Document 600 may be accessed by selecting a link in another document, such as legitimacy link 540 in document 500B. Document 600 may also be passed to the user in response to a user selecting another document, e.g., by mousing over (or right clicking on or otherwise selecting) document 500A or 500B.

The legitimacy information may comprise volume information, history information, and user rating information, such as aggregate rating information. The legitimacy information may be determined and aggregated by volume module 20, history module 22, user rating module 26, source comparison module 28, and rating aggregation module 30.

As shown in FIG. 6, legitimacy information may comprise one or more of the following information concerning an exemplary advertiser and/or advertisement document, for example: a rating of its transaction volume compared to the transaction volume of comparison advertisers (e.g., advertisers in the same industry, advertisers who bid on the same or similar keywords, or other advertisers determined to be similarly situated advertisers); a rating of its transaction volume compared to all advertisers (or all content sources of a particular type); the number of times a user has selected the document; the number of times a user made a purchase from the content source after selecting the document; a ratio of the number of user clicks to user purchases; a rating of this ratio compared to comparison advertisers (or all content sources of a particular type); the amount of the average buyer purchase; the total value of goods purchased from the advertiser as a result of selecting the advertisement; the amount paid by the advertiser to the advertisement distributor who passed the advertisement to users; the date or length of time the document provider first provided the advertisement (or any advertisement from the advertiser) to a user (or the date the advertiser first engaged in a relationship with the document provider); a rating of this length of time compared to comparison advertisers (or all advertisers); the date (or length of time) when the advertisement (or the advertiser's advertisements generally speaking) were selected a certain number of times; the number of rating users; a user approval score, such as a percentage of rating users who approve of the advertiser (e.g., within a certain period of time); the industry of the advertiser (or other identifying information about the advertiser, such as an identification of the keywords bid); industries for which users have approved the advertiser; geographical areas associated with the advertiser (e.g., locations where the advertisement has been published to users, or the location of the advertiser's headquarters); number or percentage of user complaints; status with the document provider (e.g., whether the content source is approved by the document provider); and/or appropriateness ratings along a variety of criteria.

It should be understood that the server, processors, and modules described herein may perform their functions (e.g., reading optical information or determining rating information) automatically or via an automated system. As used herein, the term "automatically" refers to an action being performed by any machine-executable process, e.g., a process that does not require human intervention or input.

The embodiments of the present inventions are not to be limited in scope by the specific embodiments described herein. For example, although many of the embodiments disclosed herein have been described with reference to advertisements, the principles herein are equally applicable to other documents and content. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A computer-implemented method for providing a legitimacy rating of a content source associated with a document, comprising:
   receiving a search query wherein the search query is associated with one of a criteria or a concept;
   retrieving a set of documents from a document provider responsive to the search query, each document associated with a content source;
   determining for each document a legitimacy rating of the associated content source wherein the legitimacy rating is based on at least one of transaction and history information associated with the content source; and
   providing the set of documents and the legitimacy rating of the content source associated with the documents.

2. The method of claim 1, wherein the history information comprises a history rating of the content source based on the length of time the document provider has published documents associated with the content source.

3. The method of claim 2, wherein the history rating comprises a metric that is normalized based on history ratings of a plurality of content sources who provide documents to the document provider.

4. The method of claim 2, wherein the history rating comprises a metric that is normalized based on history ratings of a subset of content sources who provide documents to the document provider, wherein the subset of content sources are selected based on a similarity to the content source.

5. The method of claim 1, wherein the document is selected based on a relevance to the concept or the criteria.

6. The method of claim 1, wherein the legitimacy rating is provided in response to a user action.

7. The method of claim 1, wherein the history information comprises a metric based on the number of documents associated with the content source that have been provided by the document provider 8. The method of claim 1, wherein at least one document is an advertisement, and wherein the content source is an advertiser.

9. The method of claim 1, wherein at least one document is a search result, and wherein the content source is a website that is linked in the search result.

10. The method of claim 1, wherein at least one document comprises a link to a legitimacy rating document, wherein the legitimacy rating document comprises additional legitimacy rating information.

11. The method of claim 10, wherein the additional legitimacy rating information comprises a metric corresponding to a dollar amount paid by the content source to the document provider for publishing documents associated with the content source.

12. The method of claim 10, wherein the additional legitimacy rating information comprises a metric corresponding to a number of users who have provided negative feedback about the content source.

13. The method of claim 10, wherein the additional legitimacy rating information comprises a metric corresponding to a user approval rating of the content source.

14. The method of claim 10, wherein the additional legitimacy rating information comprises a metric corresponding to the document provider's approval rating of the content source.

15. The method of claim 1, wherein the legitimacy rating further comprises an aggregate user rating of the document provider.

16. A system for providing a legitimacy rating of a content source, associated with a document, comprising:
   an input device for receiving a search query wherein the search query is associated with one of a criteria or a concept;
   an output device for
      retrieving a set of documents from a document provider in response to the search query, each document associated with a content source;
      and providing the set of documents and a legitimacy rating of the content source; and a processor for determining the legitimacy rating of the content source based on at least one of transaction and history information associated with the content source.

17. A computer-implemented method for providing a legitimacy rating of a content source associated with a document, comprising:

receiving from a user a search query associated with a criteria;

selecting an advertisement based on a relevance to the criteria, wherein the advertisement is associated with an advertiser;

providing the advertisement to the user by a document provider in response to the search query; and providing to the user a legitimacy rating of the advertiser, wherein the legitimacy rating comprises at least one of:

a history rating of the advertiser based on the length of time the document provider has published advertisements associated with the advertiser; and a transaction volume rating of the advertiser based on the number of advertisements associated with the advertiser that are passed to users by the document provider.

18. A system for providing a legitimacy rating of a content source associated with a document, comprising:

an input device for receiving from a user a search query associated with a criteria;

a processor for selecting an advertisement based on a relevance to the criteria, wherein the advertisement is associated with an advertiser, and an output device of a document provider for:

providing the advertisement to the user in response to the search query; and providing to the user a legitimacy rating of the advertiser, wherein the legitimacy rating comprises at least one of:

a history rating of the advertiser based on the length of time the document provider has published advertisements associated with the advertiser, and a transaction volume rating of the advertiser based on the number of advertisements associated with the adviser that are passed to users by the document provider.

19. A computer-implemented method for providing a legitimacy rating of a content source associated with a document, comprising:

receiving from a user a search query associated with a concept;

selecting a document associated with a content source based on a relevance to the concept;

determining a legitimacy rating of the content source, wherein the legitimacy rating comprises at least one of:

a history rating of the content source based on the length of time a document provider has published documents associated with the content source; and a transaction volume rating of the content source based on the number of documents associated with the content source that are passed to users by the document provider, and providing the document and the legitimacy rating to the user in response to the search query.

20. The method of claim 19 wherein the document and the legitimacy rating are provided to the user together in a single transmission.

21. A system for providing a legitimacy rating of a content source associated with a document, comprising:

an input device for receiving from a user a search query associated with a concept;

a selection processor for selecting a document from a document provider associated with a content source based on a relevance to the concept;

a legitimacy rating processor for determining a legitimacy rating of the content source, wherein the legitimacy rating comprises at least one of:

a history rating of the content source based on the length of time the document provider has published documents associated with the content source; and a transaction volume rating of the content source based on the number of documents associated with the content source that are passed to users by the document provider; and an output device for providing the document and the legitimacy rating to the user in response to the search query.

22. The system of claim 21 wherein the output device provides the document and the legitimacy rating to the user together in a single transmission.

* * * * *

UNITED STATES PATENT AND TRADEMARK OFFICE
CERTIFICATE OF CORRECTION

PATENT NO.       : 7,657,520 B2                                    Page 1 of 1
APPLICATION NO.  : 11/070268
DATED            : February 2, 2010
INVENTOR(S)      : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,657,520 B2 | Page 1 of 1 |
| APPLICATION NO. | : 11/070268 | |
| DATED | : February 2, 2010 | |
| INVENTOR(S) | : Johnny Chen et al. | |

It is certified that error appears in the above-identified patent and that said Letters Patent is hereby corrected as shown below:

ON THE TITLE PAGE:

Item (56) in the "References Cited" list, under U.S. Patent Documents insert
-- 6,385,591 B1   5/2002   Angles --.

Signed and Sealed this

Twentieth Day of March, 2012

David J. Kappos
*Director of the United States Patent and Trademark Office*